United States Patent
Kwon et al.

(10) Patent No.: US 9,774,373 B2
(45) Date of Patent: Sep. 26, 2017

(54) METHOD AND APPARATUS FOR WIRELESSLY TRANSMITTING ENERGY BASED ON FRAME

(71) Applicant: SAMSUNG ELECTRONICS CO., LTD., Suwon-si (KR)

(72) Inventors: Ui Kun Kwon, Hwaseong-si (KR); Sang Joon Kim, Seoul (KR); Seung keun Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 817 days.

(21) Appl. No.: 13/733,664

(22) Filed: Jan. 3, 2013

(65) Prior Publication Data

US 2013/0175873 A1 Jul. 11, 2013

(30) Foreign Application Priority Data

Jan. 10, 2012 (KR) ........................ 10-2012-0002767

(51) Int. Cl.
| | | |
|---|---|---|
| H01F 27/42 | (2006.01) | |
| H01F 37/00 | (2006.01) | |
| H02J 7/00 | (2006.01) | |
| H01F 38/00 | (2006.01) | |
| H04B 5/00 | (2006.01) | |
| H02J 5/00 | (2016.01) | |
| H02J 50/12 | (2016.01) | |
| H02J 7/02 | (2016.01) | |

(52) U.S. Cl.
CPC ............ *H04B 5/0037* (2013.01); *H02J 5/005* (2013.01); *H02J 50/12* (2016.02); *H02J 7/025* (2013.01)

(58) Field of Classification Search
CPC . H02J 5/005; H02J 17/00; H02J 7/025; H01F 38/14; G01B 7/14; G06F 1/26
USPC ......................................................... 307/104
See application file for complete search history.

(56) References Cited

U.S. PATENT DOCUMENTS

| 6,906,618 B2 | 6/2005 | Hair, III et al. |
| 2004/0263321 A1 | 12/2004 | Hair, III et al. |

(Continued)

FOREIGN PATENT DOCUMENTS

| EP | 2 079 146 A2 | 7/2009 |
| EP | 2 079 146 A3 | 12/2011 |

(Continued)

OTHER PUBLICATIONS

Chinese Office Action issued on Nov. 4, 2015 in counterpart of Chinese Patent Application No. 201310007037.2 (10 pages in English; 7 pages in Chinese).

(Continued)

*Primary Examiner* — Rexford Barnie
*Assistant Examiner* — Terrence Willoughby
(74) *Attorney, Agent, or Firm* — NSIP Law

(57) ABSTRACT

An apparatus for wirelessly transmitting energy based on a frame is provided. The apparatus includes a transmitter configured to transmit, to at least one reception device, energy in a frame unit through a mutual resonance between a source resonator and a plurality of target resonators, and a controller configured to determine information included in the frame based on whether energy is transmitted to the at least one reception device, or based on whether data is transmitted to the at least one reception device.

25 Claims, 11 Drawing Sheets

(56) References Cited

U.S. PATENT DOCUMENTS

| | | | | |
|---|---|---|---|---|
| 2005/0127869 A1* | 6/2005 | Calhoon | ................... | G06F 1/26 |
| | | | | 320/108 |
| 2009/0133942 A1 | 5/2009 | Iisaka et al. | | |
| 2009/0271048 A1* | 10/2009 | Wakamatsu | ............ | G06F 1/266 |
| | | | | 700/296 |
| 2009/0281678 A1 | 11/2009 | Wakamatsu | | |
| 2010/0253281 A1 | 10/2010 | Li | | |
| 2012/0112555 A1 | 5/2012 | Toshimitsu et al. | | |
| 2012/0299389 A1* | 11/2012 | Lee | ...................... | H04B 5/0031 |
| | | | | 307/104 |
| 2013/0029595 A1* | 1/2013 | Widmer | ............... | H04B 5/0031 |
| | | | | 455/39 |

FOREIGN PATENT DOCUMENTS

| | | |
|---|---|---|
| JP | 2009-268311 A | 11/2009 |
| KR | 10-2010-0004599 A | 1/2010 |
| KR | 10-2011-0044005 A | 4/2011 |
| KR | 10-2011-0094382 A | 8/2011 |
| WO | WO 2006/031133 A1 | 3/2006 |

OTHER PUBLICATIONS

Japanese Office Action dated Mar. 15, 2016 in counterpart Japanese Application No. 2012-278723 (5 pages in Japanese with English translation).

Extended European Search Report dated Aug. 1, 2017, in corresponding European Application No. 13150294.0 (9 pages, in English).

* cited by examiner

METHOD AND APPARATUS FOR WIRELESSLY TRANSMITTING ENERGY BASED ON FRAME

CROSS-REFERENCE TO RELATED APPLICATION(S)

This application claims the benefit under 35 U.S.C. §119(a) of Korean Patent Application No. 10-2012-0002767, filed on Jan. 10, 2012, in the Korean Intellectual Property Office, the entire disclosure of which is incorporated herein by reference for all purposes.

BACKGROUND

1. Field

The following description relates to a method and apparatus for wirelessly transmitting energy based on a frame.

2. Description of Related Art

Mobile devices such as a smart phone, a tablet personal computer (PC), and a laptop computer are increasing. With development of near field communication technologies such as a wireless local area network (LAN), Bluetooth, and the like, systems increasingly operate by constructing a single application in several mobile devices in addition to information exchange between mobile devices of the same user or other users. Most of the systems may include a mobile device. A battery of the mobile device may have a limited charge capacity, and may require frequent charging in comparison to a conventional device. Thus, near-field wireless power transmission may be one method of resolving such issues.

The near-field wireless power transmission refers to a distance between transmission and reception coils sufficiently short in comparison to a wavelength at an operating frequency. A wireless power transmission and reception system using a resonance characteristic may include a source configured to provide power and a target configured to receive power. In a process of transmitting and receiving wireless power, the source and the target may share control information.

SUMMARY

In one general aspect, an apparatus for wirelessly transmitting energy based on a frame is provided. The apparatus includes a transmitter configured to transmit, to at least one reception device, energy in a frame unit through a mutual resonance between a source resonator and a plurality of target resonators, and a controller configured to determine information included in the frame based on whether energy is transmitted to the at least one reception device, or based on whether data is transmitted to the at least one reception device.

The transmitter may transmit a second energy frame after maintaining an idle state during a time period of a predetermined inter energy frame space (IEFS) subsequent to transmission of a first energy frame being completed.

The first energy frame may include a preamble including advance information used for the at least one reception device to receive the energy frame, an energy frame header (EFH) including control information, and an energy frame body (EFB) including energy transmitted to the at least one reception device.

The preamble may include information used to detect the first energy frame, and to estimate a channel through which the energy is transmitted.

The EFH may include information on a length of the first energy frame, an identification (ID) of a transmission device that transmits the first energy frame, an ID of a reception device that receives the first energy frame, and an ID of the at least one reception device.

The controller may control contention for occupying an energy transmission channel among at least one transmission device after the time period of the predetermined IEFS.

The contention may be performed by setting a basic time unit to a slot time, and the slot time corresponds to the predetermined IEFS.

The controller may insert a data frame into an energy frame body in a super-frame structure, and the transmitter may transmit energy and data in a frame unit.

The transmitter may transmit a second data frame after maintaining an idle state during a time period of a predetermined inter data frame space (IDFS) subsequent to transmission of a first data frame being completed within a section of the EFB.

The apparatus may further include a receiver configured to receive a response signal from a reception device that receives the first data frame after maintaining an idle state during a time period of the predetermined IDFS.

The first data frame may include a start of frame (SoF) indicating a start of the first data frame, a data frame header (DFH) including control information, and a data frame body (DFB) including data information.

The data frame header may include information on a length of the first data frame, a type of the first data frame, an ID of a transmission device that transmits the first data frame, an ID of a reception device that receives the first data frame, and a modulation and coding scheme (MCS).

The controller may control contention for occupying a data transmission channel between a transmission device that transmits the first data frame and a reception device that receives the first data frame after the time period of the predetermined IDFS.

The contention may be performed by setting a basic time unit to a slot time, and the slot time may correspond to the predetermined IDFS.

The apparatus may further include a training unit configured to use information included in the preamble to perform a downlink training from a transmission device to a reception device, and an uplink training from the reception device to the transmission device.

The training unit may substantially simultaneously perform the downlink training and the uplink training in response to communication being performed between the transmission device and the reception device in a full duplex scheme.

The at least one reception device may be a plurality of reception devices.

The at least one target resonator may be a plurality of target resonators.

The controller may use a carrier sense multiple access/collision avoidance (CSMA/CA) to control the contention.

In another aspect, an apparatus for wirelessly receiving energy based on a frame is provided. The apparatus includes a receiver configured to receive, from a transmission device, energy in a frame unit through a mutual resonance between a source resonator and a target resonator, and a controller configured to control an operation of a reception device based on information included in a frame received by the receiver.

The receiver may receive an energy frame in a predetermined minimum inter energy frame space (IEFS).

The controller may include a detector configured to detect the energy frame based on information included in a preamble of the energy frame, a channel estimator configured to estimate a channel through which the energy frame is transmitted based on information included in a preamble of the energy frame, and a synchronization estimator configured to estimate time synchronization of an operation switch of the reception device based on information included in a preamble of the energy frame.

The receiver may receive a data frame in a predetermined minimum inter data frame space (IDFS) within a section of an energy frame body.

The apparatus may further include a transmitter configured to transmit a data frame from the reception device to the transmission device after maintaining an idle state during a time period of the predetermined minimum IDFS.

In another aspect, a method of wirelessly transmitting energy based on a frame is provided. The method includes transmitting, to at least one reception device, energy in a frame unit through a mutual resonance between a source resonator and a plurality of target resonators, and determining information included in the frame based on whether energy is transmitted to the at least one reception device, or based on whether data is transmitted to the at least one reception device.

Other features and aspects may be apparent from the following detailed description, the drawings, and the claims.

Figure 1:
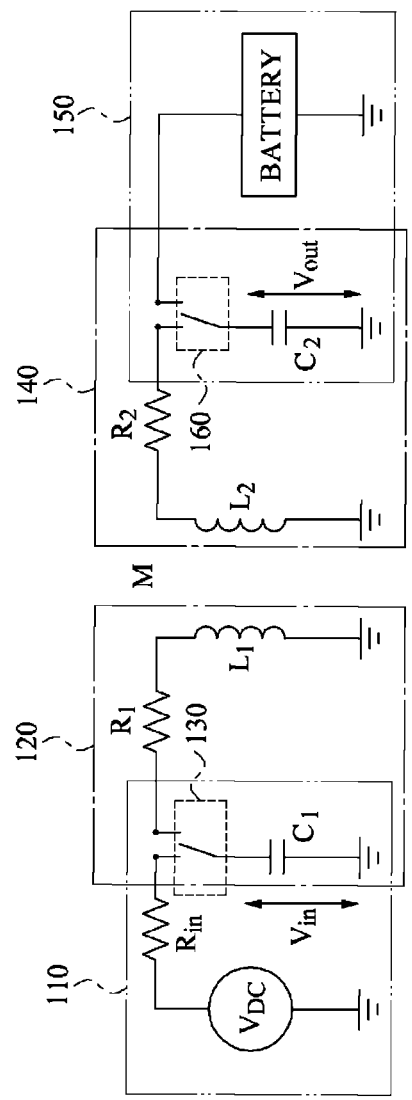
FIG. 1 is a diagram illustrating an example of an equivalent circuit of a communication system using wireless power.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

A communication system using wireless power may be applied to a remote control of an information storage device excluding a power source. The communication system may be applied to a system configured to remotely provide power for driving a device to the information storage device, and wirelessly load information stored in the information storage device.

The communication system using wireless power may store energy from a power supply device in a source resonator, and the communication system may turn off a switch that electrically connects the power supply device and the source resonator. Thus, the communication system may induce self-resonance of the source resonator. In response to a target resonator having the same resonant frequency as a resonant frequency of a self-resonating source resonator being sufficiently near to the source resonator where the target resonator may be coupled with the source resonator. In response to the target resonator coupling with the source resonator, a mutual resonance may occur between the source resonator and the target resonator.

The source resonator may refer to a resonator provided with energy from a power supply device, and the target resonator may refer to a resonator receiving energy delivered via a mutual resonance.

FIG. 1 illustrates an example of an equivalent circuit of a communication system using wireless power. In the equivalent circuit, a capacitor C1 and a switch unit 130 may physically isolate a power input unit 110 and a power transmission unit 120, and a capacitor $C_2$ and a switch unit 160 may physically isolate a receiver 140 and a power output unit 150.

Referring to FIG. 1, the communication system using wireless power may correspond to a source-target configuration having a source and a target. The communication system using wireless power may include a wireless power transmission device and a wireless power reception device. The wireless power transmission device may correspond to a source, and the wireless power reception device may correspond to a target.

The wireless power transmission device includes the power input unit 110, the power transmission unit 120, and the switch unit 130. The power input unit 110 may use a power supply device to store energy in the capacitor $C_1$. The switch unit 130 may connect the capacitor $C_1$ to the power input unit 110 while energy is stored in the capacitor $C_1$, and may disconnect the capacitor $C_1$ from the power input unit 110. In response to the capacitor $C_1$ being disconnected from the power input unit 110, the capacitor $C_1$ may be connected to the power transmission unit 120 while energy stored in the capacitor $C_1$ is discharged. The switch unit 130 prevents the capacitor $C_1$ from being simultaneously connected to both the power input unit 110 and the power transmission unit 120.

The power transmission unit 120 may transfer electromagnetic energy to the receiver 140. A transmission coil $L_1$ of the power transmission unit 120 may transfer power through a mutual resonance with a reception coil $L_2$ of the receiver 140. A mutual inductance M may affect a level of the mutual resonance occurring between the transmission coil $L_1$ and reception coil $L_2$.

The power transmission unit 120 may quantize the energy for each symbol unit to transmit energy stored in a capacitor. In other words, the power transmission unit 120 may control an amount of energy transmitted for each symbol unit, differently, to transmit information. In this example, a symbol unit may refer to a unit in which a single piece of bit information is delivered between a source and a target, and the unit may correspond to a period in which the switch unit 130 controls charging and discharging of a capacitor, in one instance.

The power input unit 110 includes an input voltage $V_{DC}$, an internal resistance $R_{in}$, and a capacitor $C_1$. The power transmission unit 120 includes basic circuit elements $R_1$, $L_1$, and $C_1$ which reflect a physical property corresponding to the power transmission unit 120. The switch unit 130 may include at least one switch. The switch unit 130 may include a plurality of switches. An active device may be used as a switch to perform an ON and OFF function. In this example, R relates to a resistance component, L relates to an inductor component, and C relates to a capacitance component. $V_{in}$ may indicate a voltage across the capacitor $C_1$ corresponding to a portion of the input voltage $V_{DC}$.

The wireless power reception device includes the receiver 140, the power output unit 150, and the switch unit 160. The receiver 140 may receive electromagnetic energy from the power transmission unit 120. The receiver 140 may store received electromagnetic energy in a capacitor connected to the receiver 140. The switch unit 160 may connect the capacitor $C_2$ to the receiver 140 while energy is stored in the capacitor $C_2$, and may disconnect the capacitor $C_2$ from the receiver 140. Thus, in response to the capacitor $C_2$ being disconnected from the receiver 140, the capacitor $C_2$ may be connected to the power output unit 150 while energy stored in the capacitor $C_2$ is delivered to a load. The switch unit 160 may prevent the capacitor $C_2$ from being simultaneously connected to both the receiver 140 and the power output unit 150.

A reception coil $L_2$ of the receiver 140 may receive power through a mutual resonance with the transmission coil $L_1$ of the power transmission unit 120. The capacitor $C_2$ connected to the reception coil $L_2$ may be charged using the received power. The power output unit 150 may output the power the charged capacitor $C_2$ to a battery. As another example, the power output unit 150 may deliver power to a load or a target device instead of the battery.

The receiver 140 may receive energy, from the power transmission unit 120, in a symbol unit, and demodulate information transmitted from a source according to an amount of the energy received.

The receiver 140 includes basic circuit elements $R_2$, $L_2$, and $C_2$ by reflecting a physical property corresponding to the receiver 140. The power output unit 150 includes the capacitor $C_2$ and the battery, and the switch unit 160. The switch unit 160 may include at least one switch. The switch unit 160 may include a plurality of switches. $V_{out}$ may indicate a voltage across the capacitor $C_2$ corresponding to a portion of the energy received by the reception coil $L_2$.

As to be described, a resonator isolation (RI) system for transmitting power by physically isolating the power input unit 110 and the power transmission unit 120, and the receiver 140 and the power output unit 150 may have advantages in comparison to a conventional scheme using an impedance matching. For example, the RI system may not use a power amplifier since power may be supplied directly from a direct current (DC) source to a source resonator, the RI system may not use rectification through a rectifier since energy is captured from power stored in a capacitor at a reception end, and transmission efficiency of the RI system may not be responsive to a change in a distance between a transmission end and a reception end since impedance matching may not be used. The RI system may be easily extended to a communication system that uses wireless power and includes a plurality of transmission ends and a plurality of reception ends.

Figure 2:
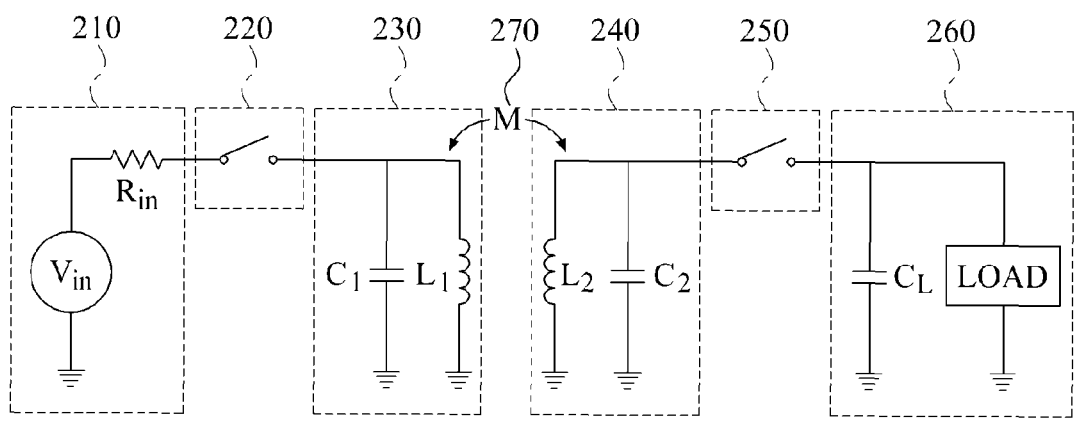
FIG. 2 is a diagram illustrating another example of an equivalent circuit of a communication system using wireless power.

FIG. 2 illustrates an example of an equivalent circuit of a communication system using wireless power in which a power charger 210 and a transmitter 230 are physically isolated by one switch, and a charger 240 and a power output unit 260 are physically isolated by another switch.

Referring to FIG. 2, the communication system using wireless power may correspond to a source-target configuration having a source and a target. In another example, the communication system using wireless power may include a wireless power transmission device corresponding to a source and a wireless power reception device corresponding to a target.

The wireless power transmission device includes the power charger 210, a controller 220, and the transmitter 230. The power charger 210 may include a power supply device $V_{in}$ and a resistor $R_{in}$. The transmitter 230 may transmit energy stored in a source resonator through a mutual resonance between the source resonator and a target resonator. The source resonator may include a capacitor $C_1$ and an inductor $L_1$. The controller 220 may connect the power charger 210 to the transmitter 230 via a switch to provide power from the power charger 210 to the source resonator. The power supply device $V_{in}$, may apply a voltage to the capacitor $C_1$, and may apply a current to the inductor $L_1$. In response to the wireless power transmission device reaching a steady state, a voltage applied to the capacitor $C_1$ may become "0," and a current flowing through the inductor $L_1$ may have a value of $V_{in}/R_{in}$. At the steady state, the applied current may charge the inductor $L_1$.

The controller 220 may turn the switch OFF in response to power stored in the source resonator reaching a predetermined value at the steady state. Information of the predetermined value may be set in the controller 220. In this example, the power charger 210 and the transmitter 230 may be isolated from each other. In this instance, the source resonator may initiate a self-resonance between the capacitor $C_1$ and the inductor $L_1$. In other words, energy stored in the source resonator may be delivered to the target resonator through a mutual resonance between the source resonator and the target resonator based on a mutual inductance M 270. In this instance, a resonant frequency $f_1$ of the source resonator may correspond to a resonant frequency $f_2$ of the target resonator.

$$f_1 = \frac{1}{2\pi\sqrt{L_1 C_1}},$$

$$f_2 = \frac{1}{2\pi\sqrt{L_2 C_2}}$$

$$f_1 = f_2$$

The transmitter 230 may quantize the energy for each symbol unit to transmit energy stored in the source resonator. In other words, the transmitter 230 may control an amount of energy transmitted for each symbol unit, differently, to transmit information. In this example, a symbol unit may refer to a unit in which a single piece of bit information is delivered between a source and a target, and the symbol unit may correspond to a period in which an operation of the controller 220 controls charging and discharging of a capacitor, in one instance.

The wireless power reception device includes the charger 240, a controller 250, and the power output unit 260. The target resonator includes a capacitor $C_2$ and an inductor $L_2$. In response to a mutual resonance occurring between the source resonator and the target resonator, the source resonator and the target resonator may be isolated. In particular, the source resonator may be isolated from the power supply device $V_{in}$, and the target resonator may be isolated from a load and a capacitor $C_L$. A mutual resonance may charge the capacitor $C_2$ and the inductor $L_2$ of the target resonator. The controller 250 may turn a switch off to charge the target resonator. While the switch is OFF, a resonant frequency of the source resonator may correspond to a resonant frequency of the target resonator, and thus a mutual resonance may occur. In response to power charged in the target resonator reaching a predetermined value, the controller 250 may turn the switch ON. Information of the predetermined value may be set in the controller 250. In response to the switch being ON, the capacitor $C_L$ may be connected to the target resonator, and a resonant frequency of the target resonator may change.

$$f_2' = \frac{1}{2\pi\sqrt{L_2(C_2 + C_L)}}$$

Thus, the mutual resonance between the source resonator and the target resonator may be terminated. In response to $f_2'$ being sufficiently small in comparison to $f_2$, in consideration of Q (Quality) factor of the target resonator, a mutual resonant channel may cease to exist. The power output unit 260 may deliver, to the load, power stored in the capacitor $C_2$ and the inductor $L_2$. The power output unit 260 may deliver power appropriate for the load.

The controller 250 may turn the switch OFF in response to power charged in the target resonator having a value less than a predetermined value. The charger 240 may charge the target resonator through a mutual resonance between the source resonator and the target resonator.

The charger 240 may receive, from the transmitter 230, energy in a symbol unit, and the charger 240 may demodulate information transmitted from a source according to an amount of the energy received.

The switch may not be turned ON in response to a mutual resonance occurring between the source resonator and the target resonator. Thus, prevention of a decrease in transmission efficiency due to a connection of a switch may occur.

In response to the analog circuit of FIG. 2 being compared to an equivalent circuit of FIG. 1 in which energy charged in a capacitor is delivered, controlling a point in time of capturing energy stored in the target resonator may be easier. While delivering energy charged in a capacitor may capture energy stored in the capacitor, changing a resonant frequency may capture energy stored in an inductor and a capacitor of the target resonator. Thus, a degree of freedom for the point in time of capturing energy may be enhanced.

Referring to FIG. 2, to transmit power or data, a transmission end of an RI system may repeat an operation of charging the source resonator with energy and then discharging the source resonator through a connection of a switch. An operation of charging and discharging the source resonator at one instance may be defined as a single symbol.

Figure 3:
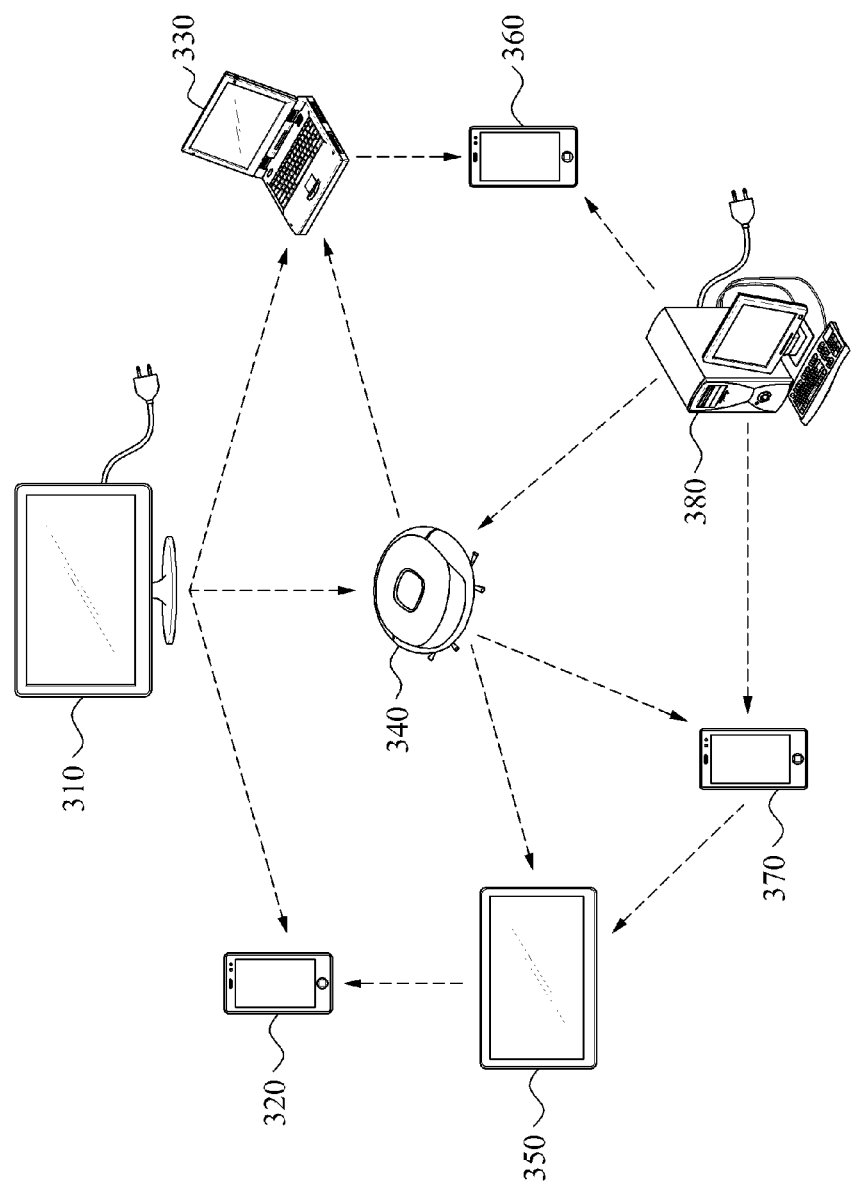
FIG. 3 is a diagram illustrating an example of a scenario to which an apparatus for wirelessly transmitting energy based on a frame may be applied.

FIG. 3 illustrates an example of a scenario to which an apparatus for wirelessly transmitting energy based on a frame may be applied.

In response to a technology for wirelessly transmitting power being universal, an energy sharing service for wirelessly exchanging power among various devices, as illustrated in FIG. 3, is provided. A television (TV) 310 or a desktop personal computer (PC) 380 wiredly provided with power may wirelessly provide power to devices such as smart phones 320, 360, and 370, a robot vacuum 340, a laptop computer 330, and the like. The laptop computer 330 or the robot vacuum 340 provided with power from the TV 310 may also share energy with the smart phones 320, 360, and 370, a tablet PC 350, and the like. In another example, power may be exchanged among the smart phones 320, 360, and 370.

An energy sharing scenario described in the foregoing may include at least one energy transmitting terminal and at least one energy receiving terminal. In a network including at least one energy transmitting terminal and at least one energy receiving terminal, a predetermined transmitting terminal may transmit energy to a predetermined receiving terminal, and a wireless power transmission channel may be effectively shared among at least one transmission terminal, as in a conventional wireless communication.

An apparatus for wirelessly transmitting energy based on a frame may provide an energy sharing framework among multiple terminals that may effectively exchange power in a network in which a multi-point to multi-point (MP2MP) is located, as shown in the energy sharing scenario of FIG. 3.

Data may be transmitted concurrently with an exchange of power, and an effective bidirectional training scheme may be provided to transmit power and data.

Figure 4:
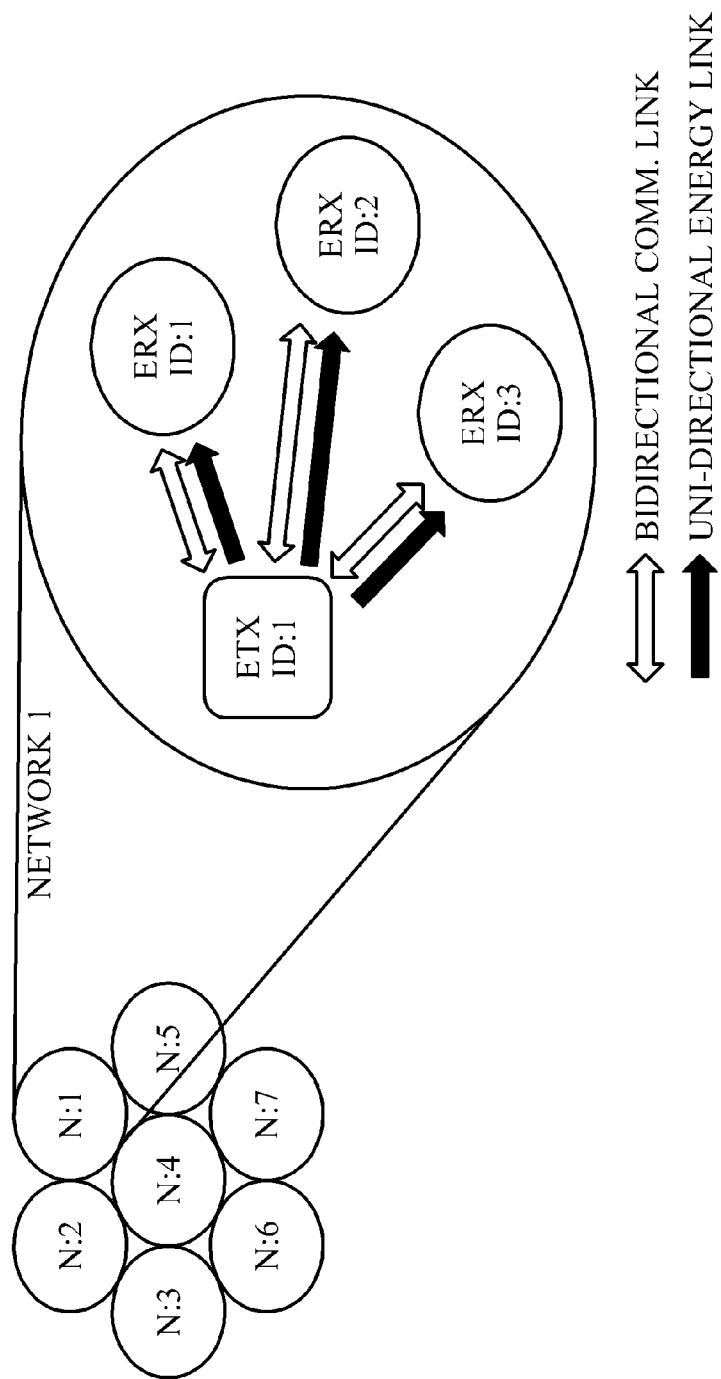
FIG. 4 is a diagram illustrating an example of a topology of power and data transmission in a network to which an apparatus for wirelessly transmitting energy based on a frame is applied.

FIG. 4 illustrates an example of a topology of power and data transmission in a network circumstance to which an apparatus for wirelessly transmitting energy based on a frame is applied.

Referring to FIG. 4, in a system including at least one network, Network 1 may have a single energy transmitter (ETX) and at least one energy receiver (ERX). In this instance, the ETX and the at least one ERX may exchange energy and data.

Each of the ETX and the at least one ERX may have a unique identification (ID). In response to a plurality of ETXs and a plurality of ERXs being included, the apparatus for wirelessly transmitting energy, based on a frame, may transmit energy in a frame unit to effectively transmit and receive energy and data.

Figure 5:
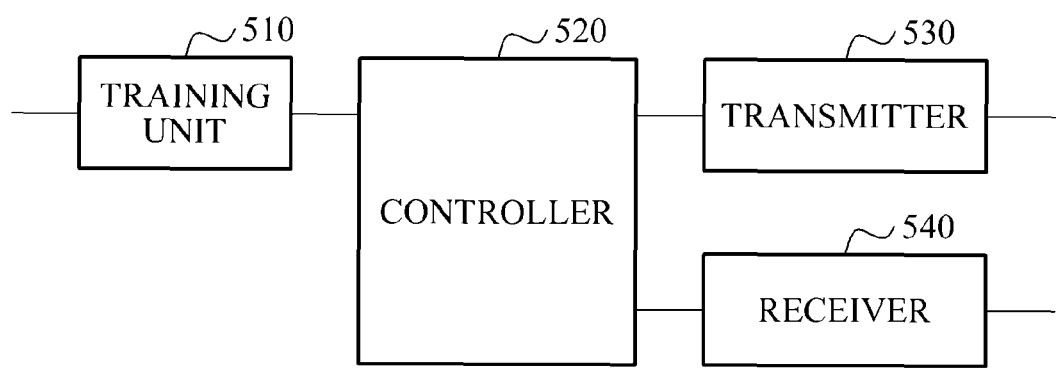
FIG. 5 is a block diagram illustrating an example of an apparatus for wirelessly transmitting energy based on a frame.

FIG. 5 illustrates an example of an apparatus for wirelessly transmitting energy based on a frame.

Referring to FIG. 5, an apparatus for wirelessly transmitting energy based on a frame includes a training unit 510, a controller 520, a transmitter 530, and a receiver 540.

The transmitter 530 may transmit energy through a mutual resonance between a source resonator and a target resonator. The energy may be transmitted to at least one reception device. The energy may be transmitted in a frame unit. An energy frame may refer to a frame used for transmitting energy.

The transmitter 530 may transmit a second energy frame after maintaining an idle state. The idle state may be maintained during a time period of at least a predetermined inter energy frame space (IEFS) subsequent to transmission of a first energy frame being completed. The predetermined IEFS may refer to a minimum time period for discriminating between the first energy frame and the second energy frame.

An energy frame includes a preamble, an energy frame header (EFH), and an energy frame body (EFB). The preamble may be positioned at a start of the energy frame, and may include advance information used for the at least one reception device to receive the energy frame. The preamble may include information used to detect the energy frame, and to estimate a channel through which the energy is transmitted.

The EFH may include control information. The control information may be used to control operations of a transmission device and a reception device. The EFH may include information related to a length of the energy frame, an identification (ID) of a transmission device that transmits the energy frame, an ID of a reception device that receives the energy frame, and IDs of the at least one reception device.

The EFB may include energy transmitted to the at least one reception devices. Energy corresponding to the EFB may refer to energy the at least one reception device is charged with.

The controller 520 may determine information included in the frame based on whether energy is transmitted to the at least one reception device, or based on whether data is transmitted to the at least one reception device. The information included in the frame may have data information.

The controller 520 may control contention for occupying an energy transmission channel among at least one transmission device after the time period of the predetermined IEFS. The at least one transmission device may determine whether to use a channel through contention. For example, the at least one transmission device may determine whether to use a channel using a backoff counter and a carrier sensing of a channel in a contention window. An example of the carrier sensing of the channel in the contention window may be a carrier sense multiple access/collision avoidance (CSMA/CA).

The contention may be performed by setting a basic time unit to a slot time, and the slot time may be determined to be a time corresponding to the predetermined IEFS.

The controller 520 may insert a data frame into an energy frame body in a super-frame structure, and the transmitter 530 may transmit energy and data in a frame unit. In response to the transmission device determining to transmit data to the reception device, the controller 520 may include information about data in a frame. The information about data in the frame may be in the energy frame. For example, an apparatus for wirelessly transmitting power may map data into a symbol according to an amount of energy stored in the source resonator, and the apparatus may transmit the mapped symbol. Thus, the controller 520 may map data into a symbol according to an amount of energy transmitted in a predetermined section. The data may include energy transmitted through the EFB, and the controller 520 may transmit the mapped symbol. In this example, the symbol mapped according to an amount of energy may be transmitted in a data frame.

The transmitter 530 may transmit a second data frame after maintaining an idle state during a time period after transmission of a first data frame within a section of the EFB. The time period may exceed a predetermined inter data frame space (IDFS) and occur subsequent to the transmission of the first data frame being completed. The predetermined IDFS may refer to a minimum time period used for discriminating between the first data frame and the second data frame.

The receiver 540 may receive a response signal from a reception device that receives the first data frame after maintaining an idle state during a time period of the predetermined IDFS. The predetermined IDFS may correspond with a minimum time period for discriminating between a transmitted data frame and a received data frame. The response signal may relate to a signal such as, for example, an acknowledgement (ACK) and a negative acknowledgement (NACK).

The data frame may include a start of frame (SoF), a data frame header (DFH), and a data frame body (DFB). The SoF may be located at an beginning of the data frame, and may indicate a start of the data frame.

The DFH may include control information. In this example, the control information may refer to information used for the transmission device to transmit data and the reception device to receive data. The DFH may include information relating to a length of the data frame, a type of the data frame, an ID of a transmission device that transmits the data frame, an ID of a reception device that receives the data frame, and a modulation and coding scheme (MCS). A specified format of the data frame such as data/management/ACK/NACK, and the like may express the information relating to a type of the data frame.

The DFB may include data information. In this example, the data information may relate to data to be delivered to the reception device from the transmission device. The DFB may include a frame check sequence (FCS).

In an example, the data frame may correspond to an automatic repeat request (ARQ) frame such as the ACK, the NACK, and the like. In the ARQ frame, a portion of the DFB may be omitted from the data frame.

The controller 520 may control contention for occupying a data transmission channel between a transmission device and a reception device after the time period of the predetermined IDFS. The transmission device may transmit the data frame. The reception device may receive the data frame. The data frame may be transmitted from the transmission device, and may be transmitted from the reception device. Thus, the transmission device and the reception device may compete for usage of a data transmission channel.

The contention may be performed by setting a basic time unit to a slot time, and the slot time may be determined to be time corresponding to the predetermined IDFS.

The training unit 510 may perform a downlink training from the transmission device to the reception device, and an uplink training from the reception device to the transmission device. The training unit 510 may use information included in the preamble to perform the downlink training and the uplink training.

The downlink training may refer to an acquisition of information used for decoding an energy frame and a data frame transmitted from the transmission device to the reception device. For example, the downlink training may estimate a state of a channel through which energy is transmitted.

The uplink training may refer to an acquisition of information for decoding a data frame transmitted from the reception device to the transmission device. For example, the uplink training may estimate a state of an uplink channel, the uplink training may detect a frame, and the uplink training may estimate time synchronization of an operation switch of the reception device.

The training unit 510 may simultaneously perform the downlink training and the uplink training in response to communication being performed between the transmission device and the reception device in a full duplex scheme. In the full duplex scheme, the transmission device and the reception device may simultaneously exchange data. The training unit 510 may simultaneously perform the downlink training and the uplink training based on a waveform of energy exchanged in a preamble section.

The controller 520 may perform an overall control of the apparatus for wirelessly transmitting energy based on a frame, and the controller 520 may perform functions of the training unit 510, the transmitter 530, and the receiver 540. The training unit 510, the controller 520, the transmitter 530, and the receiver 540 are separately illustrated in FIG. 5 to separately describe each function. As another aspect, the training unit 510, the controller 520, the transmitter 530, and the receiver 540 may be combined into a single unit. Thus, in response to implementing a product, the controller 520 may perform all of the functions, or may perform a portion of the functions.

Figure 6:
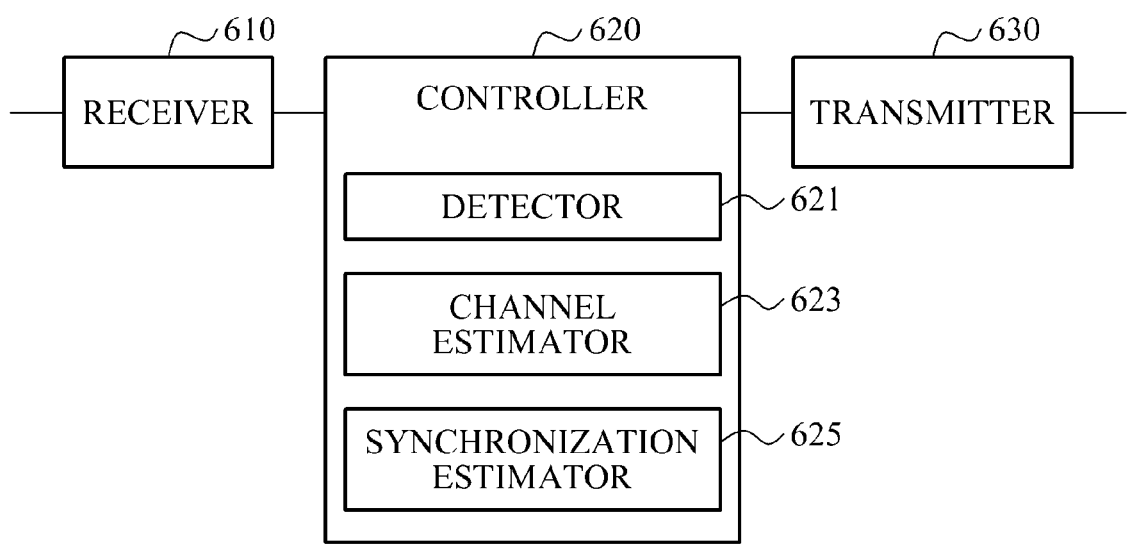
FIG. 6 is a block diagram illustrating another example of an apparatus for wirelessly receiving energy based on a frame.

FIG. 6 illustrates an example of an apparatus for wirelessly receiving energy based on a frame.

Referring to FIG. 6, an apparatus for wirelessly receiving energy based on a frame includes a receiver 610, a controller 620, and a transmitter 630.

The receiver 610 may receive energy in a frame unit through a mutual resonance between a source resonator and a target resonator. The energy may be received from a transmission device.

The controller 620 may control an operation of a reception device based on information included in a received frame. A frame may include energy the reception device is charged with, and may include data delivered from the transmission device in a data frame. In response to receiving a data frame, the controller 620 may control the reception device according to content of the corresponding data.

The receiver 610 may receive energy frames in a predetermined minimum IEFS. Placing a predetermined IEFS between energy frames may allow the energy frames to be distinguished from one another.

The controller 620 includes a detector 621, a channel estimator 623, and a synchronization estimator 625. The detector 621 may use information included in a preamble of the energy frame to detect an energy frame. The detector 621 may use an SoF from the preamble to detect an energy frame.

The channel estimator 623 may estimate a channel through which the energy frame is transmitted based on information included in a preamble of the energy frame. The channel estimator 623 may estimate a channel through which the energy frame is transmitted. The channel estimator 623 may use an uplink training to estimate the channel through which the energy frame is transmitted. The channel estimator 623 may estimate a channel through which the energy frame is transmitted. The channel estimator 623 may use a downlink training to estimate the channel through which the energy frame is transmitted.

The synchronization estimator 625 may estimate time synchronization of an operation switch of the reception device based on information included in a preamble of the energy frame. The synchronization estimator 625 may estimate time synchronization of an operation switch. The synchronization estimator 625 may use an uplink training to estimate the time synchronization.

The receiver 610 may receive a data frame in a predetermined minimum IDFS within a section of an energy frame body. Placing a predetermined minimum IDFS between energy frames may allow the data frames to be distinguished from one another.

The transmitter 630 may transmit a data frame from the reception device to the transmission device after maintaining an idle state for a time period of at least the predetermined minimum IDFS. In this instance, the data frame may include a response signal such as an ACK and an NACK, and may include data information.

The controller 620 may perform an overall control of the apparatus for wirelessly receiving energy based on a frame, and may perform functions of the receiver 610 and the transmitter 630. The receiver 610, the controller 620, and the transmitter 630 are separately illustrated in FIG. 6 to describe each function, individually. Thus, in response to implementing a product, the controller 620 may perform all of the functions, or the controller 620 may perform a portion of the functions. As another aspect, the receiver 610, the controller 620, and the transmitter 630 may be combined into a single unit.

Figure 7:
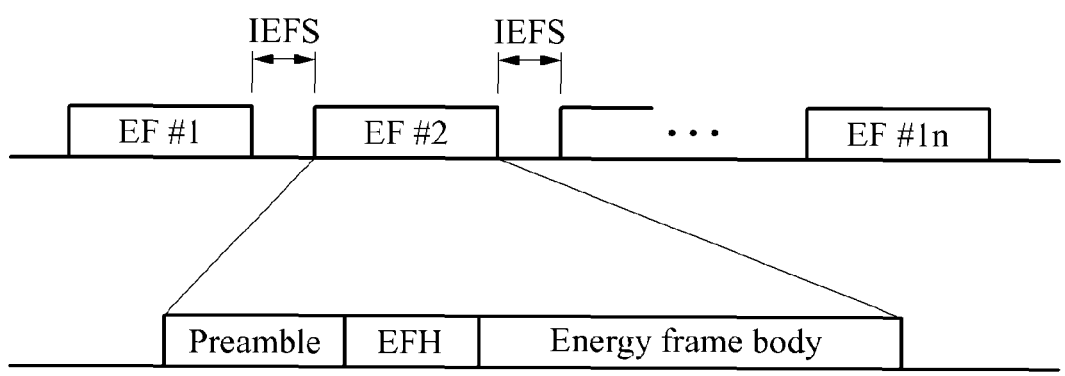
FIG. 7 is a diagram illustrating an example of an energy frame transmitted by an apparatus for wirelessly transmitting energy based on a frame.

FIG. 7 illustrates an example of an energy frame transmitted by an apparatus for wirelessly transmitting energy based on a frame.

Referring to FIG. 7, an EF may correspond to an energy frame, an IEFS may correspond to an inter energy frame space, and an EFH may correspond to an energy frame header. Each ETX may transmit energy in a frame unit.

To transmit a subsequent energy frame after completing transmission of an energy frame, an idle state may be maintained for a time period corresponding to at least a predetermined minimum IEFS.

A single energy frame includes a preamble, an EFH, and an EFB. A training that enables an ERX to acquire advance information may be performed. Thus, the ERX may receive an energy frame transmitted by an ETX. The ERX may use the preamble to receive the energy frame. The preamble may include information about detecting a frame and estimating an energy transmission channel, an SoF informing a start of a frame, and the like.

In an RI system corresponding to one of wireless power transmission schemes, the ERX may detect a frame during a preamble section, and estimate time synchronization of an operation switch of the ERX during the preamble section.

The ETX may transmit various types of control information through the EFH. For example, the EFH may include information on a length of an energy frame, an ID of the ETX that transmits the energy frame, an ID of the ERX that receives the energy frame. The energy frame is denoted by an EF in FIG. 7, In response to simultaneously transmitting energy and data, the EFH may include information on a modulation and coding scheme (MCS) of a data frame to be transmitted. The ETX may transmit energy to the ERX through an energy frame body subsequent to the EFH.

Figure 8:
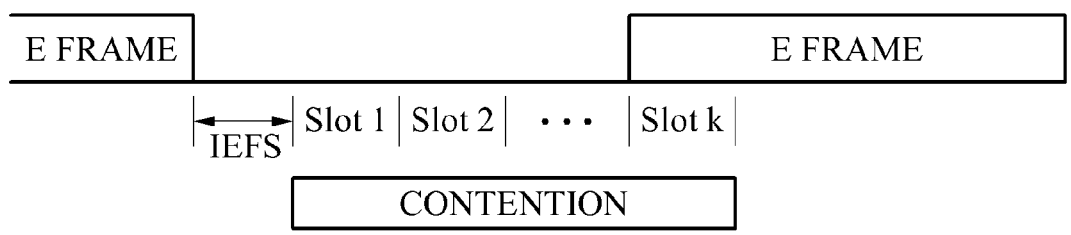
FIG. 8 is a diagram illustrating an example of a transaction of an energy frame transmitted by an apparatus for wirelessly transmitting energy based on a frame.

FIG. 8 illustrates an example of a transaction of an energy frame transmitted by an apparatus for wirelessly transmitting energy based on a frame.

In response to transmission of a single energy frame being terminated, a plurality of ETXs may perform contention to transmit an energy frame. The single energy frame may be referred to as an E frame. A channel may maintain an idle state during a time period of a predetermined IEFS before the contention. The contention may be performed based on a slot time after the predetermined IEFS. In response to a single ETX existing, the ETX may transmit an energy frame immediately after the IEFS subsequent to transmission of a single energy frame. A time period of a predetermined IEFS may be used as a slot time.

Figure 9:
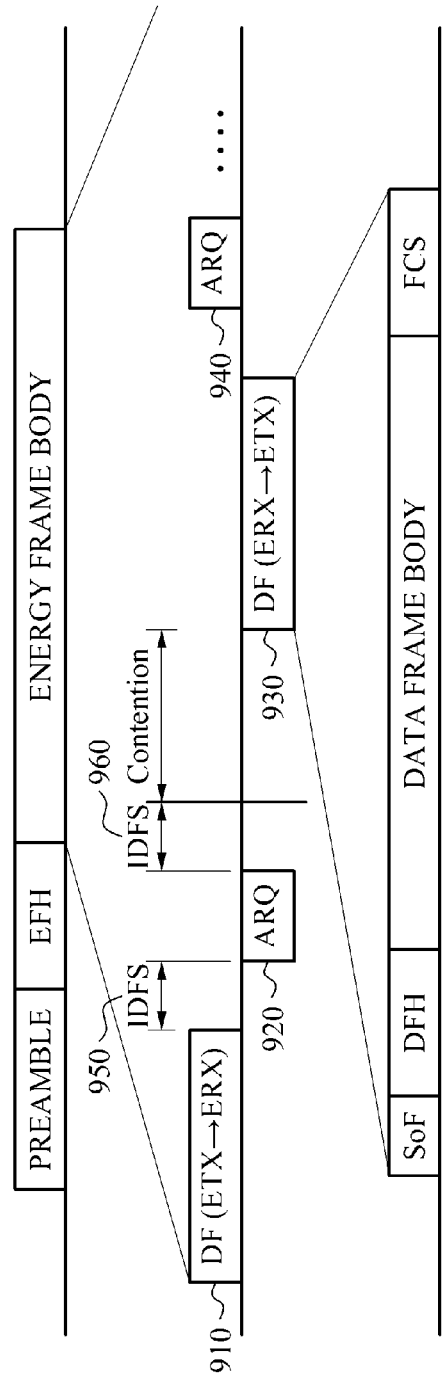
FIG. 9 is a diagram illustrating an example of a data frame of a super-frame structure used for simultaneously transmitting energy and data by an apparatus for wirelessly transmitting energy based on a frame.

FIG. 9 illustrates an example of a data frame of a super-frame structure used for simultaneously transmitting energy and data by an apparatus for wirelessly transmitting energy based on a frame.

Referring to FIG. 9, a DF corresponds to a data frame, an IDFS corresponds to an inter data frame space, an ARQ corresponds to an automatic repeat request, and an FCS corresponds to a frame check sequence.

In an EFB section, data frames may be successively transmitted with intervals of a minimum IDFS.

A data frame includes an SoF, a DFH, and a DFB. The SoF may indicate a start of the data frame. The DFH may include information on a length of the data frame, information on a type of the data frame, information on IDs of an ETX and an ERX that exchange the data frame, and information on an MCS. The DFB may include substantial data information and an FCS.

In an example, the data frame may correspond to an ARQ frame. The ARQ frame may be an ACK, an NACK, and the like, and the ARQ frame may exclude a DFB.

The information on a type of the data frame to be included in the DFH may indicate a specified format of the data frame such as data/management/ACK/NACK, and the like.

The ETX may transmit a DF 910 to the ERX. After an IDFS 950 passes, the ERX may transmit an ARQ frame 920 to the ETX. After an IDFS 960 passes, contention may be performed between the ETX and the ERX, and the ERX may transmit a DF 930 to the ETX. After an IDFS (not illustrated) passes, the ERX may transmit an ARQ frame 940 to the ETX.

Figure 10:
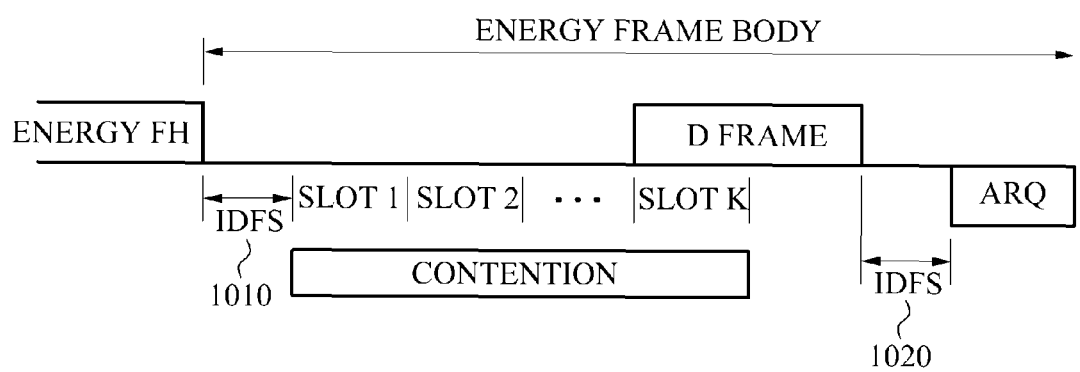
FIG. 10 is a diagram illustrating an example of a transaction of a data frame transmitted by an apparatus for wirelessly transmitting energy based on a frame.

FIG. 10 illustrates an example of a transaction of a data frame transmitted by an apparatus for wirelessly transmitting energy based on a frame.

In response to transmission of a single data frame being completed, a data transmission channel may maintain an idle state during a time period of IDFSs 1010 and 1020. The IDFSs 1010 and 1020 may be a minimum. A contention may be performed based on a slot time after the minimum IDFS 1010. A time period of the minimum IDFS 1010 may be used as a slot time, and the slot time may be distinguished from a slot time used in an energy frame transmission.

Figure 11:
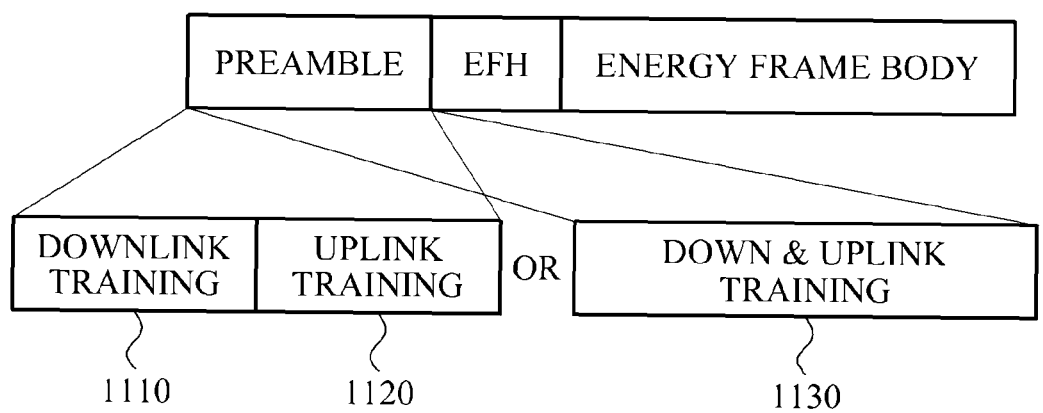
FIG. 11 is a diagram illustrating an example of a training performed between an apparatus for wirelessly transmitting energy based on a frame and an apparatus for wirelessly receiving energy based on a frame.

FIG. 11 illustrates an example of a training performed between an apparatus for wirelessly transmitting energy based on a frame and an apparatus for wirelessly receiving energy based on a frame.

Referring to FIG. 11, during a preamble section, an ETX may perform a downlink training 1110 for a decoding of an energy frame and a data frame transmitted from the ETX to an ERX. The ETX may use a preamble to perform the downlink training 1110. Thereafter, the ERX may perform an uplink training 1120.

In response to simultaneously transmitting energy and data, during a preamble section of an energy frame transmitted by the ETX, the ERX may perform a training directed to the ETX. In other words, the training directed to the ETX may correspond to an uplink training.

In response to performing full duplex communication, an uplink training and a downlink training 1130 may be simultaneously performed.

After the preamble, the ETX may estimate, in an EFH, a parameter value using the preamble, and may transmit the EFH. For example, the ETX may include, in an EFH, MCS information to be used for an uplink and a downlink by estimating a state of an uplink channel and a downlink channel, and may transmit the EFH.

An apparatus for wirelessly transmitting energy based on a frame may perform, using a preamble of an energy frame, an uplink training and a downlink training in a single transaction, and may include, in an EFH, parameter values acquired through the single transaction, and may transmit the EFH.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for wirelessly transmitting energy based on a frame, the apparatus comprising:
    a transmitter configured to transmit, to at least one reception device, energy for charging the at least one reception device in a frame through a mutual resonance between a source resonator and at least one target resonator;
    a controller configured to determine whether energy is transmitted to the at least one reception device, or whether the energy and data are transmitted to the at least one reception device,
    wherein:
        the frame comprises a preamble and an energy frame body (EFB), the EFB comprises the energy and at least one data frame, and the at least one data frame comprises a data frame body (DFB) including data information, and wherein the transmitter transmits the frame comprising the EFB and the DFB inserted in the EFB, in response to the determination that the energy and the data in the at least one data frame are transmitted to the at least one reception device.

2. The apparatus of claim 1, wherein the transmitter is configured to transmit, subsequent to transmission of the frame being completed, a second frame after maintaining an idle state for a time period of an inter energy frame space (IEFS).

3. The apparatus of claim 2, wherein the first energy frame comprises a preamble comprising advance information used for the at least one reception device to receive the energy frame, an energy frame header (EFH) including control information, and the energy frame body (EFB) including energy transmitted to the at least one reception device.

4. The apparatus of claim 3, wherein the preamble comprises information used to detect the first energy frame, and to estimate a channel through which the energy is transmitted.

5. The apparatus of claim 3, wherein the EFH comprises information on a length of the first energy frame, an identification (ID) of a transmission device that transmits the first energy frame, an ID of a reception device that receives the first energy frame, and an ID of the at least one reception device.

6. The apparatus of claim 2, wherein the controller is configured to control contention for occupying an energy transmission channel among at least one transmission device after the time period of the IEFS.

7. The apparatus of claim 6, wherein the contention is performed by setting a basic time unit to a slot time, and the slot time corresponds to the IEFS.

8. The apparatus of claim 3, wherein:
the controller is configured to insert the data frame into the EFB in a super-frame structure, and
the transmitter is configured to transmit the energy and the data in a frame.

9. The apparatus of claim 8, wherein:
the transmitter is configured to transmit, subsequent to transmission of the first data frame being completed within a section of the EFB, a second data frame after maintaining an idle state for a time period of an inter data frame space (IDFS).

10. The apparatus of claim 9, further comprising:
a receiver configured to receive a response signal from the at least one reception device that receives the first data frame after maintaining an idle state for a time period of the IDFS.

11. The apparatus of claim 9, wherein the first data frame comprises a start of frame (SoF) indicating a start of the first data frame and a data frame header (DFH) including control information, and the data frame body (DFB) including data information.

12. The apparatus of claim 11, wherein the data frame header comprises information on a length of the first data frame, a type of the first data frame, an ID of a transmission device that transmits the first data frame, an ID of a reception device that receives the first data frame, and a modulation and coding scheme (MCS).

13. The apparatus of claim 9, wherein the controller is configured to control contention for occupying a data transmission channel between a transmission device that transmits the first data frame and a reception device that receives the first data frame after the time period of the IDFS.

14. The apparatus of claim 13, wherein the contention is performed by setting a basic time unit to a slot time, and the slot time corresponds to the IDFS.

15. The apparatus of claim 3, further comprising:
a training unit configured to use information included in the preamble to perform a downlink training from a transmission device to a reception device, and an uplink training from the reception device to the transmission device.

16. The apparatus of claim 15, wherein the training unit is configured to perform the downlink training and the uplink training substantially simultaneously in response to communication being performed between the transmission device and the reception device in a full duplex scheme.

17. An apparatus for wirelessly receiving energy based on a frame, the apparatus comprising:
a receiver configured to receive, from a transmission device, energy in a frame through a mutual resonance between a source resonator and a target resonator; and
a controller configured to control an operation of a reception device based on information included in a frame received by the receiver, wherein:
the frame comprises an energy frame body (EFB) including the energy,
the EFB comprises a first data frame and a second data frame, the second data frame being transmitted after a period of time following transmission of the first data frame, and
the at first data frame comprises a data frame body (DFB), including data information,
wherein the transmission device determines whether the energy is transmitted to the receiver, or whether the energy and data are transmitted to the receiver, and
wherein the transmitter transmits the frame comprising the EFB and the DFB inserted in the EFB, in response to the energy and the data being transmitted to the receiver.

18. The apparatus of claim 17, wherein the receiver is configured to receive the energy frame in a minimum inter energy frame space (IEFS).

19. The apparatus of claim 18, wherein the controller comprises:
a detector configured to detect the energy frame based on information included in a preamble of the energy frame; and
a channel estimator configured to estimate a channel through which the energy frame is transmitted based on information included in a preamble of the energy frame.

20. The apparatus of claim 17, wherein the receiver is configured to receive the first data frame in a minimum inter data frame space (IDFS) within a section of the EFB.

21. The apparatus of claim 20, further comprising:
a transmitter configured to transmit the first data frame from the reception device to the transmission device after maintaining an idle state during the time period of the minimum IDFS.

22. A method of wirelessly transmitting energy based on a frame, the method comprising:
transmitting, to at least one reception device, energy in a frame through a mutual resonance between a source resonator and at least one target resonator; and
determining information included in the frame based on whether energy is transmitted to the at least one reception device, or based on whether the energy and data are transmitted to the at least one reception device, wherein:
the frame comprises an energy frame body (EFB) including the energy,
the EFB comprises at least one data frame, and
the at least one data frame comprises a data frame body (DFB) including data information, and wherein the frame comprises the EFB and the DFB inserted in the EFB, in response to the energy and the data being transmitted to the at least one reception device.

23. The apparatus of claim 1, wherein the at least one reception device is a plurality of reception devices.

24. The apparatus of claim 1, wherein the at least one target resonator is a plurality of target resonators.

25. The apparatus of claim 6, wherein the controller uses a carrier sense multiple access/collision avoidance (CSMA/CA) to control the contention.

* * * * *